(12) United States Patent
Wang et al.

(10) Patent No.: US 7,920,335 B2
(45) Date of Patent: Apr. 5, 2011

(54) MOVABLE LENS MODULE AND OPTICAL LENS MODULE

(75) Inventors: Yu-Jen Wang, Taipei County (TW); Shyang-Jye Chang, Taipei County (TW); Chien-Shien Yeh, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 261 days.

(21) Appl. No.: 12/110,367

(22) Filed: Apr. 28, 2008

(65) Prior Publication Data

US 2009/0279186 A1 Nov. 12, 2009

(30) Foreign Application Priority Data

Dec. 20, 2007 (TW) .............................. 96148980 A

(51) Int. Cl.
*G02B 15/14* (2006.01)

(52) U.S. Cl. ........................................ 359/696; 359/824
(58) Field of Classification Search .................... 359/696
See application file for complete search history.

(56) References Cited

U.S. PATENT DOCUMENTS

| 6,140,750 | A | * | 10/2000 | Ueyama | ........................ 310/369 |
| 6,215,605 | B1 | | 4/2001 | Kuwana et al. | |
| 6,392,827 | B1 | * | 5/2002 | Ueyama et al. | ............... 359/824 |

* cited by examiner

*Primary Examiner* — Jordan M. Schwartz
*Assistant Examiner* — James C Jones
(74) *Attorney, Agent, or Firm* — Jianq Chyun IP Office

(57) ABSTRACT

A movable lens module includes a plate type piezoelectric driving unit, a movable stage, a lens base and a lens group. The movable stage is in contact with the plate type piezoelectric driving unit, and is driven by the plate type piezoelectric driving unit to move. The lens base is disposed on the movable stage. The lens group includes at least one lens installed in the lens base. An optical lens module can be assembled by components of the movable lens module.

18 Claims, 5 Drawing Sheets

US 7,920,335 B2

MOVABLE LENS MODULE AND OPTICAL LENS MODULE

CROSS-REFERENCE TO RELATED APPLICATION

This application claims the priority benefit of Taiwan application serial no. 96148980, filed on Dec. 20, 2007. The entirety of the above-mentioned patent application is hereby incorporated by reference herein and made a part of specification.

BACKGROUND OF THE INVENTION

1. Field of the Invention

The present invention relates to a movable lens module and an optical lens module.

2. Description of Related Art

Mobile cameras or common cameras available in the market generally have zooming and focusing functions for users to shoot scenes according to personal need. The zooming and focusing can be performed by means of the motor drive, magnetic drive, or piezoelectric material drive, and the like.

The technology of the motor drive is mature. In the motor drive mode, a step motor is mainly used to drive a lens group through transmission elements such as screws or ropes, so as to move the lens group and change the relative position between the lens groups. The step motor uses the pulse signal to excite a gear-like stator in sequence, such that the rotor rotates to drive the lens group and changes a rotation direction and a rotation speed by changing a signal form. The motor drive mode is advantageous in large driving force and stable action of the lens group, and thus the motor drive is adapted to a large lens design. However, the motor drive mode occupies a large space, and is disadvantageous for the minimization of the camera, and also has a low response speed, large power-consumption, and short lifespan. In the magnetic drive mode, a magnetic driving unit is mainly composed of a magnet and a coil element, and thus occupies less space than the motor. Moreover, the complicated transmission mechanisms are not required, so the magnetic drive mode has a faster response speed than the motor and produces less noise. However, in order to obtain large driving force, the turns of the coil must be increased, which increases the resistance and causes the power-consumption problem.

The piezoelectric material drive mode is under rapid development, which utilizes a regular vibration generated by the piezoelectric material to drive a carrier to move the lens group. The piezoelectric material drive mode is mainly classified into the electrostriction mode and travelling wave mode. The current piezoelectric material drive mode includes SIDM (Smoothly Impact Drive Mechanism) mode, for example, a driving device disclosed in U.S. Pat. No. 6,215,605. As shown in FIG. 1, the driving device 2 includes piezoelectric actuators 111, 112, driving rods 116, 117, and a guiding rod 120. The driving forces generated by the piezoelectric actuators 111, 112 are transmitted to a lens L2 and a lens L4 (movable lens) respectively through the driving rods 116, 117, such that the lenses L2, L4 move along the guiding rod 120 respectively, so as to perform the zooming and focusing actions.

SUMMARY OF THE INVENTION

The present invention is directed to a movable lens module and an optical lens module using a piezoelectric drive mode.

The present invention provides a movable lens module, which includes a plate type piezoelectric driving unit, a movable stage, a lens base, and a lens group. The movable stage is in contact with the plate type piezoelectric driving unit, and is driven by the plate type piezoelectric driving unit to move. The lens base is disposed on the movable stage. The lens group includes at least one lens installed in the lens base.

The present invention further provides an optical lens module, which includes a support frame, a fixed lens group, two plate type piezoelectric driving units, two movable stages, two lens bases, and two lens groups. The fixed lens group is fixed on the support frame. The two plate type piezoelectric driving units are fixed on the support frame, and are located behind the fixed lens group. The two movable stages are respectively in contact with the two plate type piezoelectric driving units, and are driven by the two plate type piezoelectric driving units respectively to move. The two lens bases are disposed on the two movable stages respectively. The two lens groups each include at least one lens disposed in the two lens bases respectively.

In the optical lens module of the present invention, one of the two lens groups is used for zooming, and the other one is used for focusing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
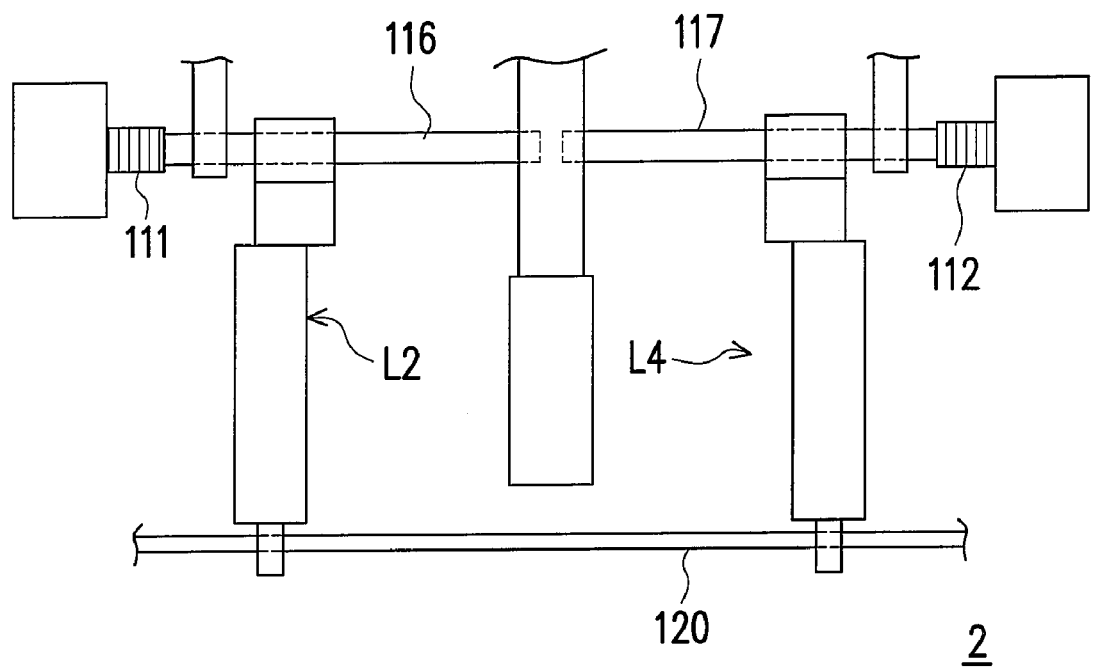
FIG. 1 is a schematic side view of a conventional movable lens module.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2:
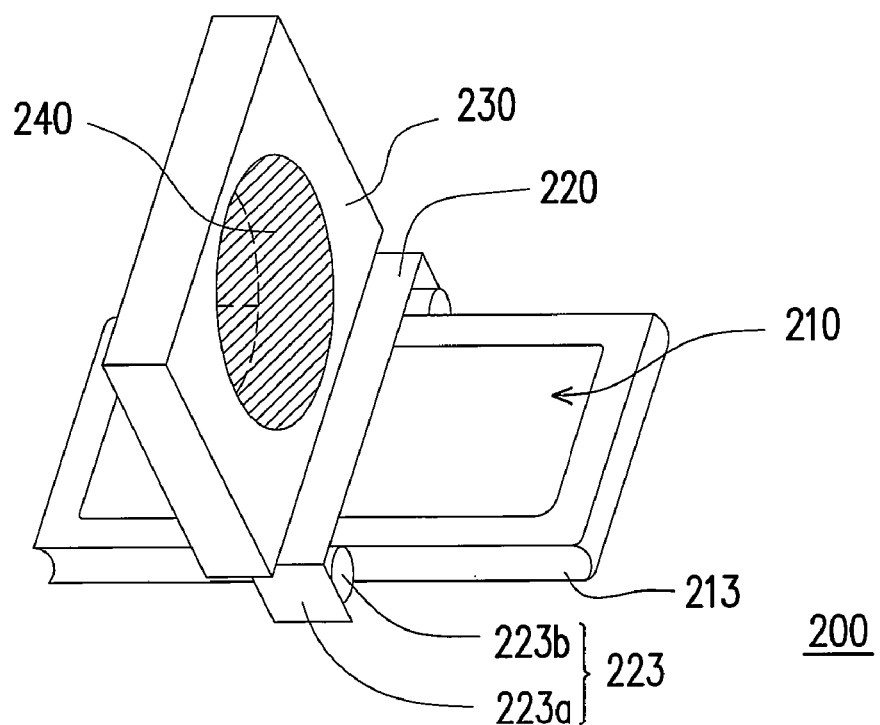
FIG. 2 is a schematic perspective view of a movable lens module according to a first embodiment of the present invention.
Figure 3:
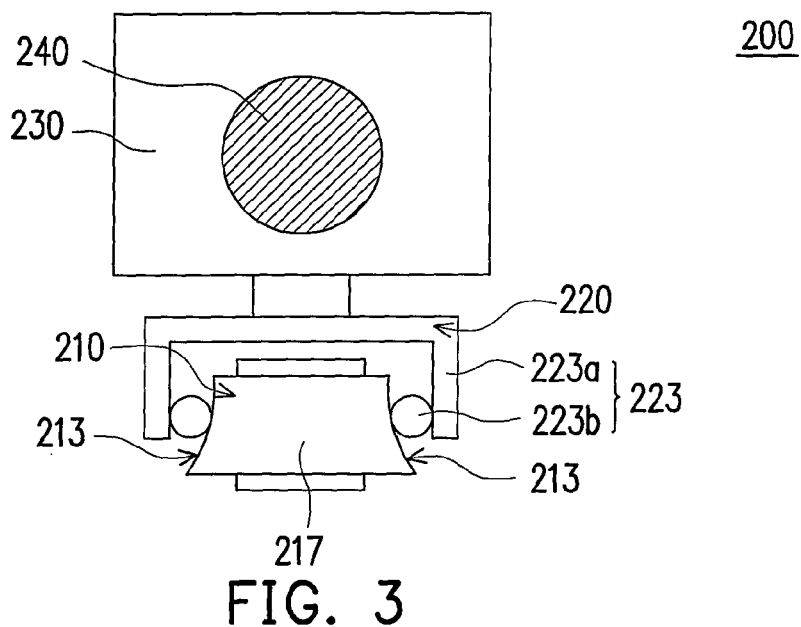
FIG. 3 is a schematic side view of the movable lens module according to the first embodiment of the present invention.

Referring to FIGS. 2 and 3, FIG. 2 is a schematic perspective view of a movable lens module according to a first embodiment of the present invention, and FIG. 3 is a schematic side view of the movable lens module according to the first embodiment of the present invention.

As shown in FIG. 2, a movable lens module 200 includes a plate type piezoelectric driving unit 210, a movable stage 220, a lens base 230 and a lens group 240.

The movable stage 220 is in contact with the plate type piezoelectric driving unit 210, and is driven by the plate type piezoelectric driving unit 210 to move. Herein, the contact between the movable stage 220 and the plate type piezoelectric driving unit 210 is used for transmitting the vibration of the piezoelectric material, such that the movable stage 220 moves accordingly. The contact mode is not limited as long as the plate type piezoelectric driving unit 210 can transmit the vibration and enable the movable stage 220 to move accordingly.

The lens base 230 is disposed on the movable stage 220 and moves along with the movable stage 220, i.e., when the movable stage 220 is driven by the plate type piezoelectric driving unit 210 to move, the lens base 230 moves along with the movable stage 220a. The moveable stage 220 and the lens base 230 can be formed integrally or combined together after being fabricated as separate parts. For example, the lens base 230 is disposed on the movable stage 220 by means of adhesion, screw combination, or other manners, as long as the lens base 230 can move along with the movable stage 220.

The lens group 240 includes at least one lens installed in the lens base 230. Therefore, the lens group 240 moves back and forth along with the movable stage 220 (i.e., move in a left-right direction in FIG. 2).

The structure of the plate type piezoelectric driving unit and the contact mode of the plate type piezoelectric driving unit and the movable stage are further described as follows.

Figure 4:
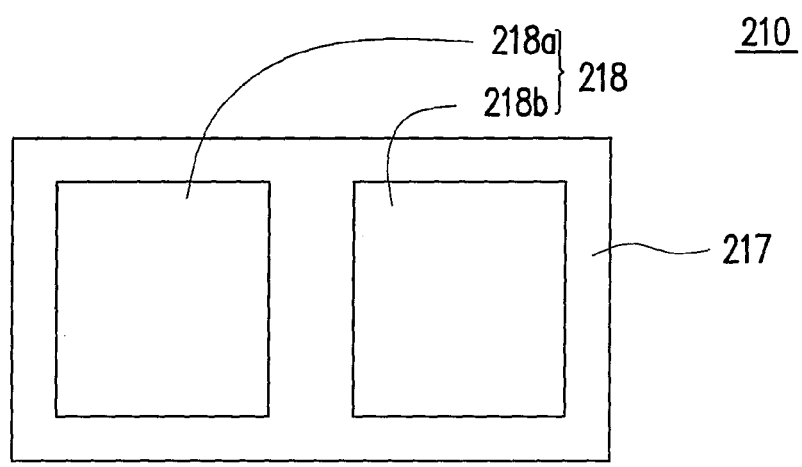
FIG. 4 is a schematic top view of the plate type piezoelectric driving unit according to the first embodiment of the present invention.
Figure 5:
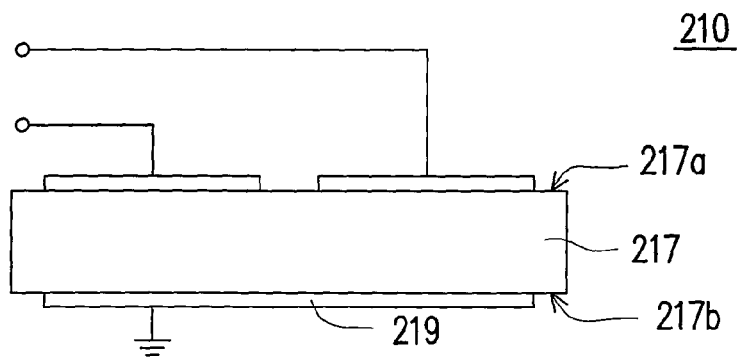
FIG. 5 is a schematic front view of the plate type piezoelectric driving unit according to the first embodiment of the present invention.

Referring to FIGS. 4 and 5, a schematic top view and a schematic front view of the plate type piezoelectric driving unit according to the first embodiment of the present invention are shown respectively.

The plate type piezoelectric driving unit 210 includes a plate type piezoelectric material 217, a direction control electrode group 218, and a ground electrode 219. The plate type piezoelectric material 217 has a first surface 217a and a second surface 217b. The direction control electrode group 218 includes a first electrode 218a and a second electrode 218b, and is disposed on the first surface 217a of the plate type piezoelectric material 217. The ground electrode 219 is disposed on the second surface 217b of the plate type piezoelectric material 217.

When the plate type piezoelectric material 217 generates vibrations towards two sides under the excitation of an electric signal, the track of the points on the edge will generate an oval-like vibration track, such that the movable stage 220 is by a force to move. When the first electrode 218a or the second electrode 218b is excited with the electric signal, the plate type piezoelectric material 217 generates different vibration modes, thereby driving the movable stage 220 to move back and forth (i.e., move in the left-right direction in FIG. 2). For example, when the first electrode 218a is supplied with power, the movable stage 220 is driven to move to the right. On the contrary, if the second electrode 218b is supplied with power, the movable stage 220 is driven to move to the left. Thus, the plate type piezoelectric driving unit 210 can drive the movable stage 220 to move back and forth along an optical axis direction (i.e., move in the left-right direction in FIG. 2). Therefore, the movable lens module 200 can perform zooming or focusing.

The contact mode of the movable stage 220 and the plate type piezoelectric driving unit 210 is not particularly limited as long as the vibration generated by the plate type piezoelectric driving unit 210 can be transmitted to the movable stage 220. The contact modes as an example shown in FIGS. 2 and 3 are described as follows.

The movable stage 220 has an engaging structure 223. The engaging structure 223 and the movable stage 220a can be formed integrally, or the engaging structure 223 is installed as an attachment on the movable stage 220. The engaging structure 223, for example, includes an elastic clamping portion 223a and a contact block 223b. Likewise, the elastic clamping portion 223a and the contact block 223b can be formed integrally or combined together after being fabricated as separate parts. The plate type piezoelectric material 217 of the plate type piezoelectric driving unit 210 is provided with a guide slot 213. The movable stage 220 is retained in the guide slot 213 of the plate type piezoelectric material 217 through the elastic clamping portion 223a and the contact block 223b of the engaging structure 223. Therefore, when the movable stage 220 is driven of the piezoelectric driving unit 210 to move, the moving direction of the movable stage 220 is guided and limited by the guide slot 213.

Figure 6:
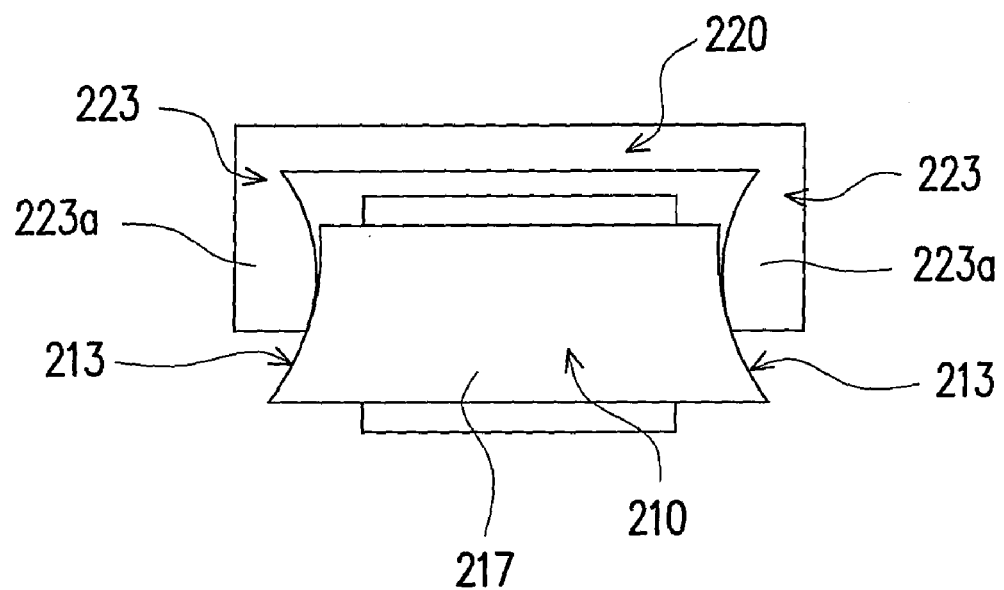
FIG. 6 is a partial schematic side view of another contact mode of the movable stage and the plate type piezoelectric driving unit according to the first embodiment of the present invention.

Referring to FIG. 6, a schematic view of another contact mode of the movable stage 220 and the plate type piezoelectric driving unit 210 is shown. In the figures, the same element numerals are used to indicate the same elements, and will not be described herein again.

The difference between the movable stage in FIG. 6 and the movable stage in FIG. 3 is described as follows. In FIG. 6, the contact block 223b is omitted, and the engaging structure 223 is retained in the guide slot 213 of the plate type piezoelectric material 217 directly through the elastic clamping portion 223a. At this time, in the engaging structure 223, only the contact block 223b is omitted or the structures of the elastic clamping portion 223a and the contact block 223b are integrated as a whole.

Figure 7:
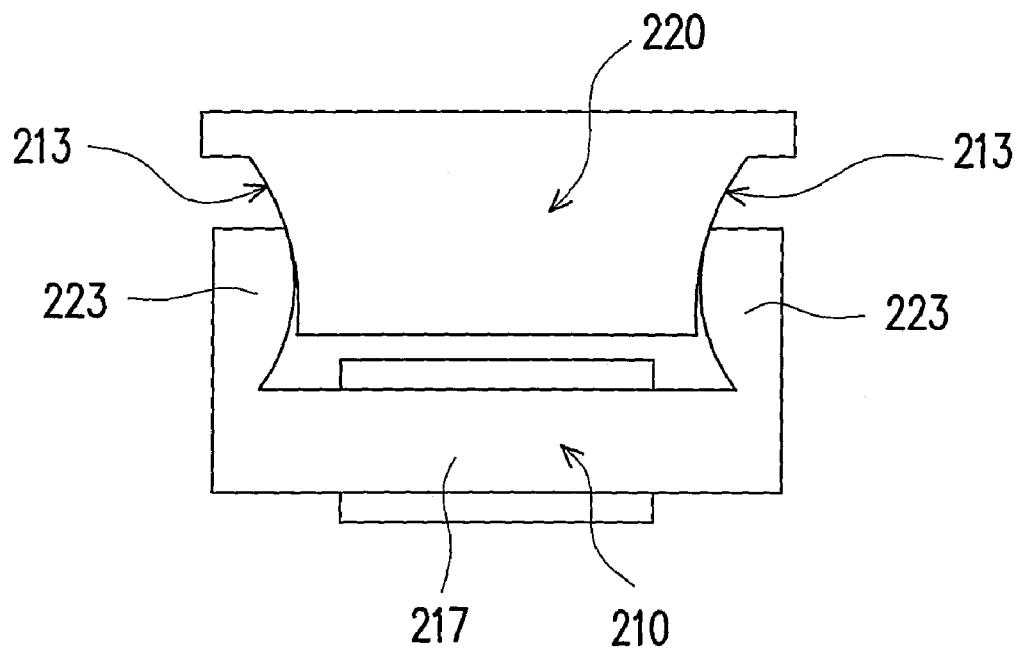
FIG. 7 is a partial schematic side view of another contact mode of the movable stage and the plate type piezoelectric driving unit according to the first embodiment of the present invention.

Referring to FIG. 7, a schematic view of another contact mode of the movable stage 220 and the plate type piezoelectric driving unit 210 is shown. In the figures, the same element numerals are used to indicate the same elements, and will not be described herein again.

In FIG. 6, the movable stage 220 has the engaging structure 223 retained in the guide slot 213 of the plate type piezoelectric material 217. However, the arrangements can be interchanged, as shown in FIG. 7.

The plate type piezoelectric material 217 has the engaging structure 223, the movable stage 220 has the guide slot 213, and the engaging structure 223 of the plate type piezoelectric material 217 is retained in the guide slot 213 of the movable stage 220.

In the above examples (FIGS. 3, 6, 7), the portion in contact with the guide slot 213 is a camber surface. However, the present invention is not limited to this, and various surfaces are possible as long as the contact surface of the engaging structure and the guide slot can transmit the vibration generated by the plate type piezoelectric material 217 to the movable stage 220.

The Second Embodiment

Figure 8:
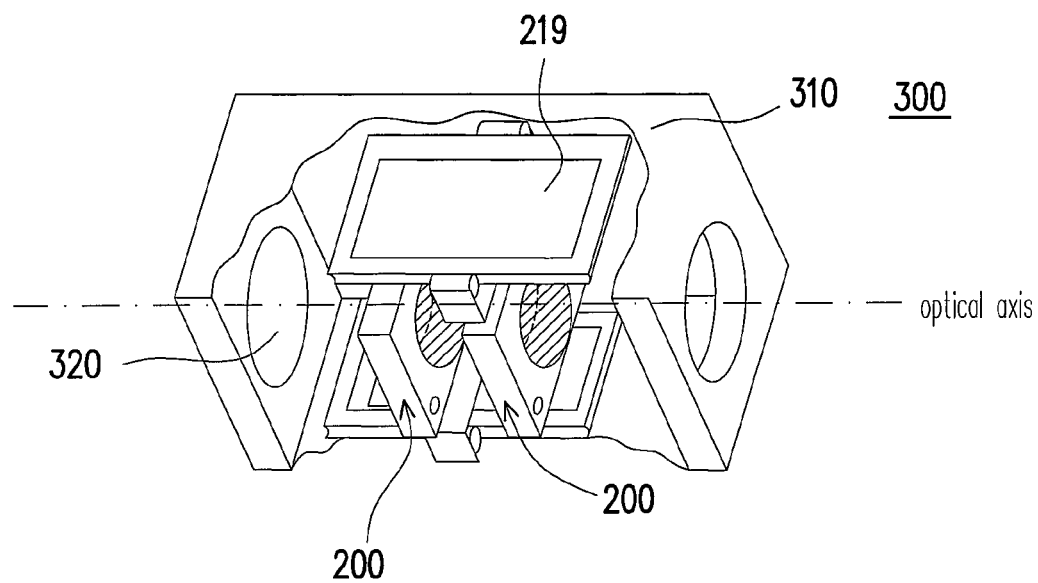
FIG. 8 is a schematic perspective view of an optical lens module according to a second embodiment of the present invention, in which a part of the support frame of the optical lens module is removed for illustrating the internal construction.
Figure 9:
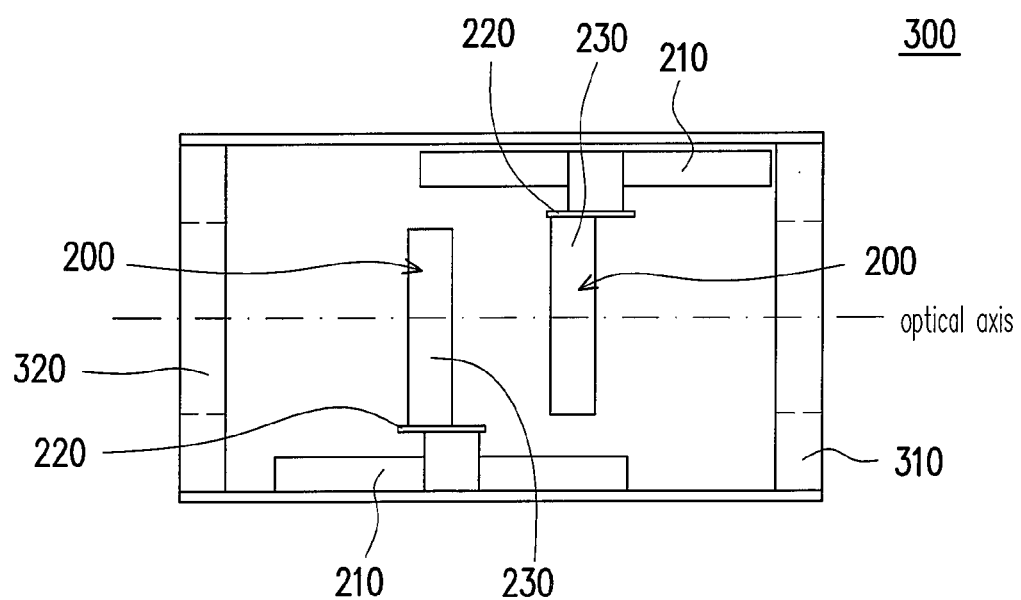
FIG. 9 is a schematic front sectional view of the optical lens module according to the second embodiment of the present invention.

Referring to FIGS. 8 and 9, FIG. 8 is a schematic perspective view of an optical lens module according to a second embodiment of the present invention, and FIG. 9 is a schematic front sectional view of the optical lens module according to the second embodiment of the present invention. In FIGS. 8 and 9, a part of the support frame of the optical lens module is removed for illustrating the internal construction, and a dashed line indicates the optical axis of the optical lens module. In the figures, the same element numerals are used to indicate the same elements, and will not be described herein again.

As shown in FIGS. 8 and 9, an optical lens module 300 includes a support frame 310, a fixed lens group 320, and two movable lens modules 200, 200. In the movable lens modules 200, one or more moveable stages 220 can be formed integrally with one or more lens bases 230. Likewise, one or more moveable stages 220 can be combined together with one or more lens bases 230 after being fabricated as separate parts.

The structure and shape of the support frame 310 is not limited, as long as the piezoelectric driving material 210 can be fixed on the support frame 310, and the fixed lens group 320 is disposed on one side thereof. For example, as shown in FIG. 8, the support frame 310 may be a rectangular casing with openings at two sides along the optical axis direction. One opening is used for disposing the fixed lens group 320, and the other one is used for the imaging light rays to pass through. Or, the support frame 310 may be a simple bracket, as long as the piezoelectric driving material and the fixed lens group can be fixed thereon.

The fixed lens group 320 is fixed on the support frame 310, for receiving light rays coming from the selected scene.

By respectively fixing the two plate type piezoelectric driving units 210, 210 on the support frame 310 and behind the fixed lens group 320, the two movable lens modules 200 are disposed behind the fixed lens group 320. For example, in FIG. 8, the two plate type piezoelectric driving units 210, 210 are fixed on the support frame 310, and are configured in a manner that the ground electrodes 219 face to the outside, such that the optical lens module 300 is minimized. However, the present invention is not limited to this, and the two plate type piezoelectric driving units 210, 210 can also be disposed on two neighbouring sides or the same side of the support frame 310.

When selecting a scene, one movable lens module 200 of the optical lens module 300 is used to zoom in/out the image of the scene, and the other movable lens module 200 is used to focus so as to form a clear image of the image.

Figure 10:
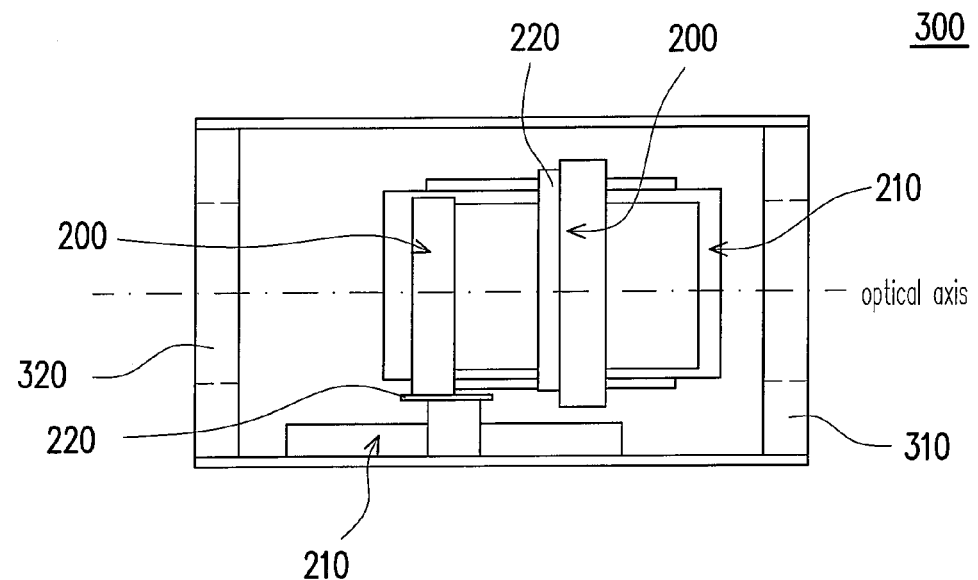
FIG. 10 shows another configuration of the two plate type piezoelectric driving units of the optical lens module according to the second embodiment of the present invention.

The configuration of the second embodiment is illustrated as follows. Referring to FIG. 10, another configuration of the two plate type piezoelectric driving units of the optical lens module according to the second embodiment of the present invention is shown. In the figures, the same element numerals are used to indicate the same elements, and will not be described herein again.

The difference between the optical lens module 300 as shown in FIG. 10 and the optical lens module 300 as shown in FIG. 9 is described as follows. The two plate type piezoelectric driving units 210 in FIG. 10 are respectively disposed on two neighbouring sides of the support frame 310, and the two plate type piezoelectric driving units 210 in FIG. 9 are respectively disposed on two opposite sides of the support frame 310. In FIG. 10, the two movable lens modules 200 of the optical lens module 300 are disposed on two neighbouring sides of the support frame 310 accordingly, and thus the optical lens module 300 is minimized.

Figure 11:
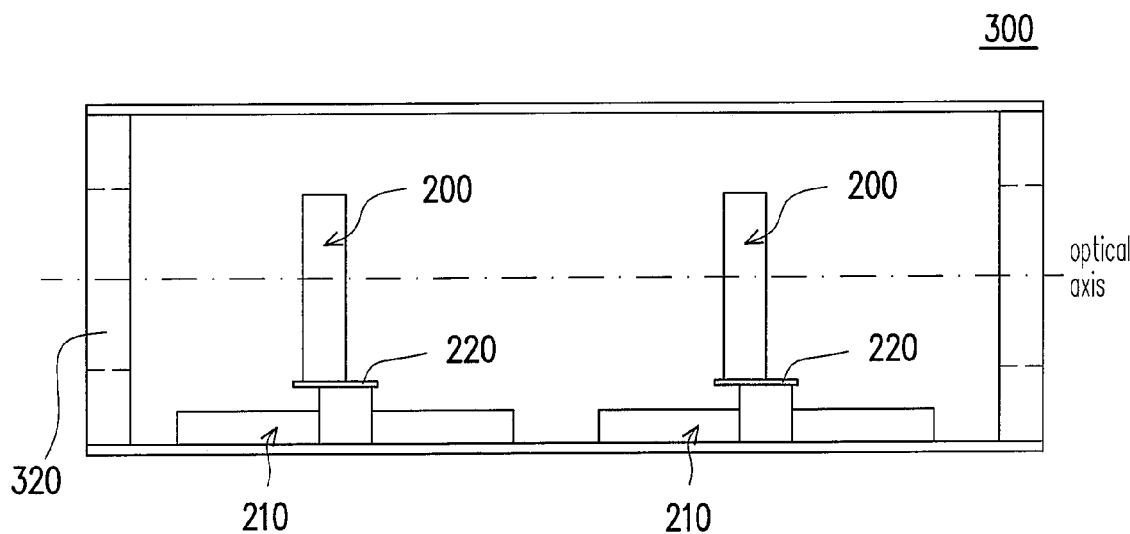
FIG. 11 shows another configuration of the two plate type piezoelectric driving units of the optical lens module according to the second embodiment of the present invention.

Referring to FIG. 11, another configuration of the two plate type piezoelectric driving units of the optical lens module according to the second embodiment of the present invention is shown. In the figures, the same element numerals are used to indicate the same elements, and will not be described herein again. In FIG. 11, the movable lens modules 200 of the optical lens module 300 are disposed on the same side of the support frame 310.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A movable lens module, comprising:
   a plate type piezoelectric driving unit;
   a movable stage, in contact with the plate type piezoelectric driving unit, and driven by the plate type piezoelectric driving unit to move;
   a lens base, disposed on the movable stage; and
   a lens group, comprising at least one lens installed in the lens base, wherein the plate type piezoelectric driving unit comprises:
      a plate type piezoelectric material, comprising a first surface and a second surface;
      a direction control electrode group, comprising a first electrode and a second electrode disposed on the first surface of the plate type piezoelectric material; and
      a ground electrode, disposed on the second surface of the plate type piezoelectric material,
      wherein the plate type piezoelectric material generates vibrations in a first direction and a second direction respectively by supplying power to the first electrode and the second electrode respectively.

2. The movable lens module according to claim 1, wherein one of the plate type piezoelectric driving unit and the movable stage is provided with a guide slot, and the other one is provided with an engaging structure retained in the guide slot.

3. The movable lens module according to claim 2, wherein a contact surface of the engaging structure and the guide slot is a camber surface.

4. The movable lens module according to claim 1, wherein the lens base is disposed by adhering on the movable stage.

5. The movable lens module according to claim 1, wherein the movable lens module is used for zooming.

6. The movable lens module according to claim 1, wherein the movable lens module is used for focusing.

7. The movable lens module according to claim 1, wherein the movable stage and the lens base are formed integrally.

8. The movable lens module according to claim 1, wherein one of the plate type piezoelectric material and the movable stage is provided with a guide slot, and the other one is provided with an engaging structure retained in the guide slot.

9. The movable lens module according to claim 8, wherein a contact surface of the engaging structure and the guide slot is a camber surface.

10. An optical lens module, comprising:
    a support frame;
    a fixed lens group, fixed on the support frame;
    two plate type piezoelectric driving units, fixed on the support frame, and located behind the fixed lens group;

two movable stages, respectively in contact with the two plate type piezoelectric driving units, and respectively driven by the two plate type piezoelectric driving units to move;

two lens bases, respectively disposed on the two movable stages; and two lens groups, each comprising at least one lens respectively installed in the two lens bases wherein each of the plate type piezoelectric driving units comprises:

a plate type piezoelectric material, comprising a first surface and a second surface;

a direction control electrode group, comprising a first electrode and a second electrode disposed on the first surface of the plate type piezoelectric material; and a ground electrode, disposed on the second surface of the plate type piezoelectric material, wherein the plate type piezoelectric material generates vibrations in a first direction and a second direction respectively by supplying power to the first electrode and the second electrode respectively.

11. The optical lens module according to claim 10, wherein the two plate type piezoelectric driving units respectively comprise a guide slot, and the two movable stages respectively comprise an engaging structure respectively retained in the two guide slots.

12. The optical lens module according to claim 10, wherein the two movable stages respectively comprise a guide slot, and the two plate type piezoelectric driving units respectively comprise an engaging structure respectively retained in the two guide slots.

13. The optical lens module according to claim 11, wherein a contact surface of the engaging structure and the guide slot is a camber surface.

14. The optical lens module according to claim 12, wherein the contact surface of the engaging structure and the guide slot is a camber surface.

15. The optical lens module according to claim 10, wherein the lens base is disposed by adhering on the movable stage.

16. The optical lens module according to claim 10, wherein one of the two lens groups is used for zooming, and the other one is used for focusing.

17. The movable lens module according to claim 10, wherein at least one of the movable stages and one of the lens bases are formed integrally.

18. The optical lens module according to claim 10, wherein the plate type piezoelectric material generates vibrations in a first direction and a second direction respectively by supplying power to the first electrode and the second electrode respectively.

* * * * *